United States Patent [19]

Ueda et al.

[11] Patent Number: 4,749,212
[45] Date of Patent: Jun. 7, 1988

[54] EMERGENCY LOCKING RETRACTOR WITH NON-LOCKING MECHANISM

[75] Inventors: Takeo Ueda; Eiji Ogawa, both of Fujisawa, Japan

[73] Assignee: Nippon Seiko Kabushiki Kaisha, Tokyo, Japan

[21] Appl. No.: 48,638

[22] Filed: May 11, 1987

[30] Foreign Application Priority Data

May 16, 1986 [JP] Japan ............................ 61-72652[U]

[51] Int. Cl.$^4$ ............................................. B60R 22/08
[52] U.S. Cl. ............................ 280/803; 242/107.4 A
[58] Field of Search .................... 280/803, 806, 807; 242/107.4 A; 297/478, 480

[56] References Cited

U.S. PATENT DOCUMENTS

| | | | |
|---|---|---|---|
| 4,040,645 | 8/1977 | Giffen et al. | 280/745 |
| 4,209,186 | 6/1980 | Close | 280/803 |
| 4,235,455 | 11/1980 | Collins et al. | 280/803 |
| 4,296,942 | 10/1981 | Clifford | 280/803 |
| 4,302,030 | 11/1981 | Clay | 280/802 |

FOREIGN PATENT DOCUMENTS

| | | |
|---|---|---|
| 34826 | 3/1980 | Japan . |
| 65239 | 5/1980 | Japan . |
| 151354 | 10/1980 | Japan . |
| 31487 | 9/1984 | Japan . |

Primary Examiner—John J. Love
Assistant Examiner—Karin L. Ferriter
Attorney, Agent, or Firm—Wegner & Bretschneider

[57] ABSTRACT

An emergency locking retractor with a non-locking mechanism is provided. The mechanism includes a lock means and first, main and auxiliary control means. The lock means is movable between an operated position, where it prevents rotation of a take-up spindle, and a non-operated position where it permits free rotation of the spindle. The first control means detects acceleration and brings the lock means to the operated position. The main control means can take either a holding state, where it holds the lock means at the non-operated position, while the lock means is not required to operate or a non-holding state where it allows the lock means to operate. The main control means is normally biased in the holding state. The auxiliary control means is movable between a first position, where it holds the main control means in the non-holding state, and a second position where it allows the main control means to be brought into the holding state. The auxiliary control means is normally biased to assume the first position.

26 Claims, 4 Drawing Sheets

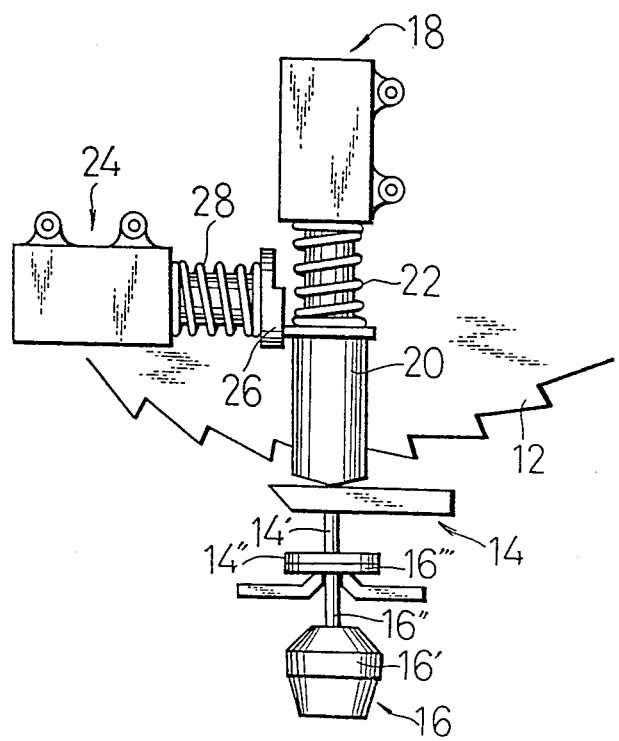

EMERGENCY LOCKING RETRACTOR WITH NON-LOCKING MECHANISM

BACKGROUND OF THE INVENTION (1) Field of the Invention

This invention relates to an emergency locking retractor with a non-locking mechanism, which is suitable for use in a seat belt system for a vehicle or the like. More specifically, this invention is concerned with an emergency locking retractor equipped with a non-locking mechanism which prevents actuation of the locking function under acceleration caused by the opening or closure of an associated vehicle door, so that it is possible to arrange, within an associated vehicle door, a retractor of such a type as locking an associated webbing to avoid any further release thereof upon detection of acceleration of at least a predetermined value.

(2) Description of the Prior Art

In general, an emergency locking retractor of the acceleration sensing type has a weight which is tilted responsive to acceleration of a vehicle and a locking mechanism is actuated by the tilting of the weight so as to prevent rotation of an associated webbing take-up spindle in the webbing-releasing direction. This emergency locking retractor is usually disposed in the main body of a vehicle, for example, in a center pillar or the like so as to sense only acceleration of the vehicle.

There is however a recent designing demand for the arrangement of a retractor within a door.

If an emergency locking retractor of the acceleration sensing type, like the aforementioned emergency locking retractor, is arranged within a door, the retractor is locked as a result of sensing of acceleration upon each opening or closure of the door. This has led to a problem that the door cannot be opened because the release of the webbing has been rendered impossible even if one tries to open the door.

SUMMARY OF THE INVENTION

An object of this invention is therefore to provide an emergency locking retractor equipped with a non-locking mechanism for holding the emergency lock mechanism in a non-operated position while emergency locking mechanism is unnecessary.

In one aspect of this invention, there is thus provided an emergency locking retractor of the type that any further release of an associated webbing wound on a take-up spindle is prevented upon detection of acceleration of at least a predetermined value, which comprises:

a lock means movable between an operated position, at which said lock means prevents the take-up spindle from rotating in the webbing-releasing direction, and a non-operated position at which said lock means permits free rotation of the take-up spindle;

a first control means for detecting acceleration of at least said predetermined value to bring said lock means to the operated position from the non-operated position;

a main control means capable of taking either a holding state, in which said main control means holds said lock means at the non-operated position, while said lock means is not required into operate or a non-holding state in which said main control means allows said lock means to operate, said main control means being normally biased in the holding state; and an auxiliary control means movable between a first position, at which said auxiliary control means holds said main control means in the non-holding state, and a second position at which said auxiliary control means allows said main control means to be brought into the holding state from the non-holding state, said auxiliary control means being normally biased to assume the first position.

In another aspect of this invention, there is also provided an emergency locking retractor of the type that any further release of an associated webbing wound on a take-up spindle is prevented upon detection of acceleration of at least a predetermined value, which comprises:

a lock means movable between an operated position, at which said lock means prevents the take-up spindle from rotating in the webbing-releasing direction, and a non-operated position at which said lock means permits free rotation of the take-up spindle;

a first control means for detecting acceleration of at least said predetermined value to bring said lock means to the operated position from the non-operated position;

a first solenoid capable of taking either a holding state, in which the first solenoid holds said lock means at the non-operated position while said lock means is not required to operate or a non-holding state in which the first solenoid allows said lock means to operate when said lock means is required to operate;

a second solenoid movable between a first state, in which the second solenoid holds the first solenoid in the non-holding state, and a second state in which the second solenoid allows the first solenoid to move from the non-holding state to the holding state; and a control circuit for bringing the first solenoid into the non-holding state from the holding state, and upon an elapsed time of a predetermined period, cutting off the feeding of electricity to the first solenoid and bringing the second solenoid from the first state into the second state, and upon an elapsed time of another predetermined period, cutting off the feeding of electricity to the second solenoid.

The emergency locking retractor according to this invention, which is equipped with the non-locking mechanism, can effectively prevent the operation of the emergency locking mechanism while emergency locking is unnecessary, because the main control means and auxiliary control means are provided in the case of the first aspect of this invention or the first solenoid and second solenoid are provided in the case of the second aspect of this invention. Owing to the combined use of the main control means and auxiliary control means in the case of the first aspect of this invention or the first solenoid and second solenoid in the case of the second aspect of this invention, it is possible to reduce the power consumption to a considerable extent especially where the main control means is controlled electrically.

BRIEF DESCRIPTION OF THE DRAWINGS

The above and other objects, features and advantages of the present invention will become apparent from the following description and the appended claims, taken in conjunction with the accompanying drawings, in which:

FIG. 2 through FIG. 4 illustrate a part of the retractor on an enlarged scale, namely, FIG. 2 is an enlarged fragmentary view of the retractor in which the emergency locking mechanism is prevented from operation;

FIG. 3 is an enlarged fragmentary view of the retractor in which the emergency locking mechanism has been released from its operation-prevented state and is ready to operate;

FIG. 4 is an enlarged fragmentary view of the retractor in which the emergency locking mechanism has been operated.

DETAILED DESCRIPTION OF THE INVENTION AND PREFERRED EMBODIMENT

The retractor according to one embodiment of this invention will be described generally, first, with reference to FIG. 2 through FIG. 4.

A ratchet wheel 12 is mounted on a take-up spindle for a webbing so that the ratchet wheel 12 is rotatable a unitary member with the take-up spindle. A lock member 14 is provided as the lock means movably between an operated position (FIG. 4), at which the lock member 14 prevents the ratchet wheel 12 from rotating in the webbing releasing direction, and a non-operated position (FIG. 3) at which the lock member 14 permits free rotation of the ratchet wheel 12. The lock member 14 is controlled by a weight 16 which operates upon detection of acceleration. On the other hand, a first and second solenoids 18,24 which constitute the main control means and auxiliary control means respectively hold the lock means in the non-operated position (FIG. 2) while emergency locking is unnecessary but allow the lock means to operate so long as there is a potential need for emergency locking.

When an associated door handle is pulled, the main control means holds the lock means at the non-operated position and maintains the lock means at the same position until the door is closed. After closure of the door, the main control means and auxiliary control means allow the lock means to operate.

Figure 1:
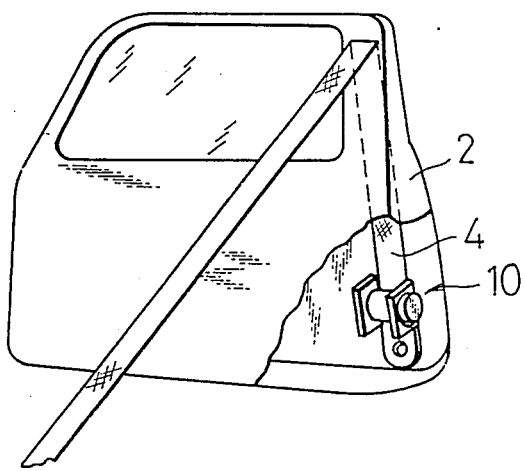
FIG. 1 shows a retractor according to one embodiment of this invention, which is equipped with an emergency locking mechanism and is arranged within a vehicle door.

The retractor will hereinafter be described specifically. The emergency locking retractor according to one embodiment of this invention is shown generally at numeral 10 in FIG. 1. As illustrated in FIG. 1, the retractor 1 is fixedly arranged within a front door 2 of a vehicle. A webbing 4, which has been pulled out of the retractor 10, extends in the interior of the vehicle and is fixed at the opposite end thereof on an unillustrated anchor mounted on a vehicle body.

The webbing 4 is wound on a take-up spindle (not shown) which is biased in the winding direction. The webbing 4 is released and rewound in accordance with the opening and closure of the door 2. The ratchet wheel 12 depicted in FIGS. 2–4 is provided in such a way that the ratchet wheel 12 is allowed to rotate together with the make-up spindle as mentioned above. The ratchet wheel 12 defines, in the outer periphery thereof, a number of teeth directed in the direction in which the webbing 4 is released.

The lock member 14 is arranged, as the lock means, underneath the ratchet wheel 12. The lock member 14 has at one end thereof a fulcrum and at the other end thereof a tooth which is engageable with any one of the teeth of the ratchet wheel 12. The lock member 14 is thus allowed to swing about the fulcrum. The lock member 14 is also equipped with a pendant portion 14', which extends downwardly and terminates in a planar portion 14". The planar portion 14" is associated with the first control means which will be described specifically. The lock member 14 is controlled and operated by the first control means and is allowed to swing about its fulcrum. When operated, the lock member 14 is swung upwardly to its operated position, where the tooth of the lock member 14 is brought into engagement with one of the teeth of the ratchet wheel 12 (FIG. 4). At its non-operated position, the lock member 14 is maintained substantially in the horizontal position and permits free rotation of the unillustrated take-up spindle (FIG. 3).

Below the lock member 14, the weight 16 in the form of an inertia sensing member is provided as the first control means. The weight 16 is formed of a weight portion 16', a stalk 16" extending upwardly from the weight portion 16', and a planar portion 16'" provided at the upper extremity of the stalk 16" and maintained in a contiguous relation with the aforementioned planar portion 14" of the lock member 14. The weight 16 is provided in such a way that it is tilted upon application of acceleration (FIG. 4). By acceleration of at least a predetermined value, the weight 16 brings the lock member 14 from the non-operated position to the operated position by way of the planar portions 14",16'".

Figure 5:
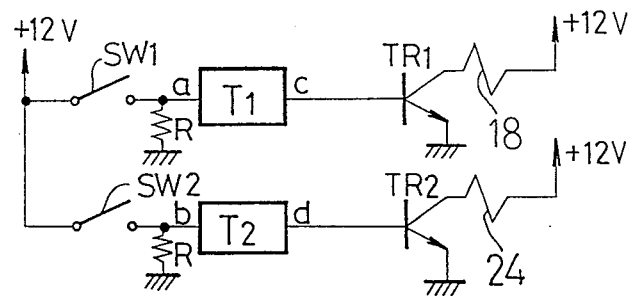
FIG. 5 is a diagram showing one example of an electric circuit for controlling the retractor of this invention.

The means for preventing the lock member 14 from swinging to the operated position while emergency locking is unnecessary is constructed of the first solenoid 18 as the main control means and the second solenoid 24 as the auxiliary control means. The first solenoid 18 acts directly on the lock member 14, whereas the second solenoid 24 acts on the first solenoid 18 to control same. These solenoids 18,24 are provided, for example, in an electric circuit such as that depicted in FIG. 5. Each of timers $T_1,T_2$ employed in the electric circuit gives an output at the rise time of each input signal and stops the output upon an elapsed time of a predetermined period irrespective of the level of the input signal. The terminals a,b of the timers $T_1,T_2$ are normally at the zero level and their terminals c,d are also at the zero level normally.

When a door switch $SW_1$ is turned on, the level of the terminal a jumps up to +12 V. Here, the timer $T_1$ is started at the rise time of the voltage at the terminal a and the terminal a is maintained at the high level for the predetermined period of time. As soon as the level of the terminal c becomes the high level, a transistor $TR_1$ is turned on so that the voltage is fed to the first solenoid 18. Upon an elapsed time of the predetermined period, the timer $T_1$ is turned off and the terminal c returns to the low level. As a result, the transistor $TR_1$ is turned off so as to stop the feeding of the voltage to the first solenoid 18.

Figure 3:
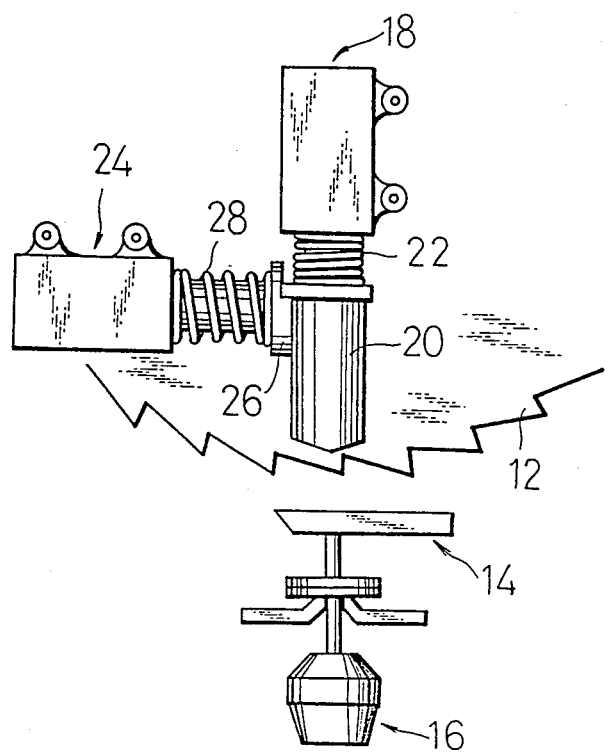
Figure 4:
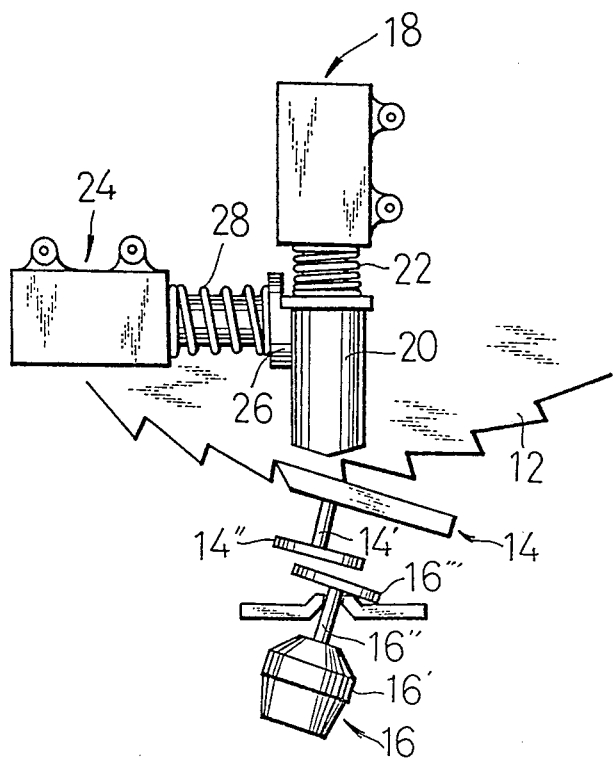

The first solenoid 18 has a plunger 20 movable in the vertical direction as seen on FIG. 2–FIG. 4 and a coil spring 22 urging the plunger 20 in the extending direction. While the first solenoid 18 is in the non-energized state, the plunger 20 has been pushed out downwardly by the coil spring 22 and the free end of the plunger 20 has been brought into abutment against the lock member 14. In this state, the lock member 14 cannot swing and is maintained in the non-operated position (this state is shown in FIG. 2). When the first solenoid 18 is energized, the plunger 20 is attracted upwardly from the holding position against the urging force of the coil spring 22 and is eventually brought to the retreated position (this state is depicted in FIG. 3). As a result, the lock member 14 is allowed to swing freely.

On one side of the first solenoid 18, the second solenoid 24 is arranged with its longitudinal axis extending at a right angle relative to that of the first solenoid 18. The second solenoid 24 has a plunger 26 movable horizontally as viewed on FIG. 2–FIG. 4 and a coil spring 28 urging the plunger 26 in the extending direction. While the second solenoid 24 is in the energized state (i.e., the state shown in FIG. 2), the plunger 26 is attracted against the urging force of the coil spring 28 and is held at a position where the plunger 26 allows the plunger 20 of the first solenoid 18 to move. When the first solenoid 18 is energized and the plunger 20 is hence brought to the retreated position, the second solenoid 24 is brought into the non-energized state so that the plunger 26 is pushed out by the urging force of the coil spring 28. In the pushed-out state, the plunger 26 is brought into engagement with the plunger 20 so as to maintain the plunger 20 at the retreated position (FIGS. 3 and 4). In this engaged state, the plunger 26 of the second solenoid 24 can maintain the plunger 20 of the first solenoid 18 at the retreated position. It is hence unnecessary to maintain the first solenoid 18 in the energized state all the time. The power consumption required to feed electricity to the first solenoid 18 can be minimized.

A further description will next be made of the operation of the emergency locking retractor 10 equipped with the non-locking mechanism of the above-described construction.

When an occupant has gotten on the vehicle and has closed the door, the door switch $SW_1$ as an exemplary first switch is turned on. By a signal input from the door switch $SW_1$, the timer $T_1$ gives an output so that the first solenoid 18 is energized and the plunger 20 is brought to the retreated position shown on FIG. 3 from the holding position depicted on FIG. 2. When the plunger 20 reaches the retreated position, the plunger 20 engages the plunger 26 of the second solenoid 24 which is in the non-energized state so that the plunger 20 is maintained at the retreated position (FIG. 3). While the door is closed, the lock member 14 is hence maintained operable and when acceleration of at least the predetermined value is sensed by the weight 16, the lock member 16 is brought from the non-operated position (FIG. 3) to the operated position (FIG. 4).

Owing to the provision of the timer $T_1$, the first solenoid 18 is brought back into the non-energized state upon an elapsed time of the predetermined period after the closure of the door by the occupant. When the occupant pulls the door handle in order to get off the vehicle, the door handle switch $SW_2$ as an exemplary second switch is turned on. By a signal input from the door handle switch $SW_2$, the timer $T_2$ gives an output so that the second solenoid 24 is energized and the plunger 26 is attracted from the holding position (FIG. 3) to the position where the plunger 26 permits free movement of the plunger 20 (FIG. 2). As a result, the plunger 20 of the first solenoid 18 which is in the non-energized state is pushed out by the urging force of the coil spring 22. When the plunger 20 reaches the preventing position (FIG. 2) from the retreated position (FIG. 3), the plunger 20 is brought into abutment against the lock member 14 so that the lock member 14 is maintained in the non-operated position. In this state, the lock member 14 is not allowed to swing to the operated position where the lock member 14 is engageable with any one of the teeth of the ratchet wheel 12. Even when the door is opened, the release of the webbing 4 is thus not prevented by the resulting acceleration. Owing to the provision of the timer $T_2$, the second solenoid 24 is brought back into the non-energized state upon an elapsed time of the predetermined period after each operation of the door handle.

If a lead wire connected to the first solenoid 18 or a coil of the first solenoid is cut off in the state illustrated in FIG. 2, the first solenoid 18 still remains in the non-energized state shown in FIG. 2 even after the associated door has been closed.

It is hence preferable to choose the strength of the coil spring 22 in such a way that even if the above-mentioned situation occurs, the lock member 14 is still allowed to engage the ratchet wheel 12 in the event of a vehicle emergency, in other words, the movement of the lock member 14 is prevented so long as the weight 16 is applied solely with low degrees of acceleration, which occur upon opening and closing the door, but the lock member 14 is allowed to move when a high degree of acceleration is applied to the weight 16 in the event of a vehicle emergency.

As has been described above, the first solenoid 18 maintains the emergency locking mechanism effectively in the non-operated state when the door is opened and closed. Owing to the provision of the second solenoid 24, it has become unnecessary to maintain the first solenoid 18 in the energized state all the time so that the power consumption can be reduced.

In the above embodiment, coil springs are used to push out the plungers. Additional solenoids may however be provided in place of the coil springs. Further, the second solenoid may take a mechanical construction which operates in association with the door handle.

Any switch may be used as the first switch so long as it can detect the state until the vehicle is about to be driven after the occupant has gotten on the vehicle. Instead of the door switch, a seat switch, ignition switch or door-lock switch may also be used equally.

Similarly, any switch may be used as the second switch so long as it can detect the state until the occupant attempts to open the door in order to get off the vehicle. An ignition switch, door-lock switch or the like may also be used equally in place of the door handle switch.

Having now fully described the invention, it will be apparent to one of ordinary skill in the art that many changes and modifications can be made thereto without departing from the spirit or scope of the invention as set forth herein.

We claim:

1. An emergency locking retractor of the type that any further release of an associated webbing wound on a take-up spindle is prevented upon detection of acceleration of at least a predetermined value, comprising:
    a lock means movable between an operated position, at which said lock means prevents the take-up spindle from rotating in the webbing-releasing direction, and a non-operated position at which said lock means permits free rotation of the take-up spindle;
    a first control means for detecting acceleration of at least said predetermined value to bring said lock means to the operated position from the non-operated position;
    a main control means capable of taking either a holding state, in which said main control means holds said lock means at the non-operated position, while said lock means is not required to operate or a non-holding state in which said main control means allows said lock means to operate, said main control means being normally biased in the holding state; and an auxiliary control means movable between a first position, at which said auxiliary control means holds said main control means in the non-holding state, and a second position at which said auxiliary control means allows said main control means to be brought into the holding state from the non-holding state, said auxiliary control means being normally biased to assume the first position.

2. The retractor as claimed in claim 1, further comprising a means for bringing said main control means forcedly into the non-holding state from the holding state.

3. The retractor as claimed in claim 1, further comprising a means for bringing said auxiliary control means forcedly to the second position from the first position.

4. The retractor as claimed in claim 1, wherein said main control means has an operating member movable between an engagement position, at which said operating member engages said lock means, and a non-engagement position at which said operating member is maintained out of engagement with said lock means, and a biasing means for normally biasing the operating member toward the engagement position.

5. The retractor as claimed in claim 4, wherein said auxiliary control means has an auxiliary control member engageable with the operating member.

6. The retractor as claimed in claim 5, wherein said auxiliary control means is equipped additionally with a second biasing means for normally biasing the auxiliary control member in such a direction that the auxiliary control member is brought into engagement with the operating member.

7. The retractor as claimed in claim 5, wherein the operating member and auxiliary control member are arranged in such a way that their moving directions cross substantially at a right angle.

8. The retractor as claimed in claim 5, wherein the operating member and auxiliary control member have engagement surfaces, which extend substantially at right angles relative to the moving direction of the operating member, and the operating member is maintained at the non-engagement position by mutual engagement of the engagement surfaces.

9. The retractor as claimed in claim 5, wherein the operating member and auxiliary control member have engagement surfaces, which extend substantially at right angles relative to the moving direction of the auxiliary control member, and the auxiliary control member is maintained at a position where the engagement surface of the auxiliary control member is maintained in engagement with the engagement surface of the operating member while allowing the operating member to move.

10. The retractor as claimed in claim 1, wherein the take-up spindle has a ratchet wheel which is rotatable as a unitary member with the take-up spindle and is equipped with teeth along the outer periphery thereof, and said lock means is a lock member movable between an operated position, at which the lock member engages any one of the teeth of the ratchet wheel, and a non-operated position retreated from the teeth.

11. The retractor as claimed in claim 1, wherein said first control means is an inertia sensing member which is tilted upon application of acceleration of at least said predetermined value so as to bring said lock means to the operated position.

12. An emergency locking retractor of the type that any further release of an associated webbing wound on a take-up spindle is prevented upon detection of acceleration of at least a predetermined value, comprising:

a lock means movable between an operated position, at which said lock means prevents the take-up spindle from rotating in the webbing-releasing direction, and a non-operated position at which said lock means permits free rotation of the take-up spindle;

a first control means for detecting acceleration of at least said predetermined value to bring said lock means to the operated position from the non-operated position;

a first solenoid capable of taking either a holding state, in which the first solenoid holds said lock means at the non-operated position while said lock means is not required to operate or a non-holding state in which the first solenoid allows said lock means to operate when said lock means is required to operate;

a second solenoid movable between a first state, in which the second solenoid holds the first solenoid in the non-holding state, and a second state in which the second solenoid allows the first solenoid to move from the non-holding state to the holding state; and a control circuit for bringing the first solenoid into the non-holding state from the holding state, and upon an elapsed time of a predetermined period, cutting off the feeding of electricity to the first solenoid and bringing the second solenoid from the first state into the second state, and upon an elapsed time of another predetermined period, cutting off the feeding of electricity to the second solenoid.

13. The retractor as claimed in claim 12, wherein the first solenoid has a plunger, which assumes a held position when the first solenoid is in the holding state or a non-held position when the first solenoid is in the non-holding state, and a biasing means for biasing the plunger toward the held position.

14. The retractor as claimed in claim 12, wherein the second solenoid has a plunger, which assumes a first position when the second solenoid is in the first state or a second position when the second solenoid is in the second state, and a biasing means for biasing the plunger toward the first position.

15. The retractor as claimed in claim 12, wherein the control circuit includes a first ON/OFF switch capable of taking an operated state responsive at least to the closed state of the associated door of a vehicle and a second ON/OFF switch capable of taking an operated state upon detection of an attempt of opening of the vehicle door, the first solenoid is fed with electricity while the first ON/OFF switch is in the operated state, and the second solenoid is fed with electricity while the second switch is in the operated state.

16. The retractor as claimed in claim 15, wherein the control circuit includes a timer connected in series to the first ON/OFF switch.

17. The retractor as claimed in claim 15, wherein the control circuit includes a timer connected in series to the second ON/OFF switch.

18. The retractor as claimed in claim 15, wherein the first ON/OFF switch is an associated door switch.

19. The retractor as claimed in claim 15, wherein the first ON/OFF switch is a switch for detecting a state that an occupant has gotten on the vehicle and the vehicle is about to be driven.

20. The retractor as claimed in claim 19, wherein the first ON/OFF switch is an associated seat switch and the operated state is the ON state of the seat switch.

21. The retractor as claimed in claim 19, wherein the first ON/OFF switch is the ignition switch of the vehicle and the operated state is the ON state of the ignition switch.

22. The retractor as claimed in claim 19, wherein the first ON/OFF switch is an associated door-lock switch and the operated state is the ON state of the door-lock switch.

23. The retractor as claimed in claim 15, wherein the second ON/OFF switch is an associated door-handle switch.

24. The retractor as claimed in claim 15, wherein the second switch is a switch for detecting a state until an occupant opens an associated door of the vehicle to get off the vehicle.

25. The retractor as claimed in claim 24, wherein the second switch is the ignition switch of the vehicle and the operated state is the OFF state of the ignition switch.

26. The retractor as claimed in claim 24, wherein the second ON/OFF switch is an associated door-lock switch and the operated state is the OFF state of the door-lock switch.

* * * * *